(12) United States Patent
Rottmerhusen

(10) Patent No.: US 8,884,557 B2
(45) Date of Patent: Nov. 11, 2014

(54) DISCONNECTION FROM MAINS USING SWITCHES FOR POWER TOOLS

(75) Inventor: Hans Hermann Rottmerhusen, Tellingstedt (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 13/517,091

(22) PCT Filed: Dec. 10, 2010

(86) PCT No.: PCT/EP2010/069331
§ 371 (c)(1),
(2), (4) Date: Jun. 19, 2012

(87) PCT Pub. No.: WO2011/085882
PCT Pub. Date: Jul. 21, 2011

(65) Prior Publication Data
US 2012/0249023 A1 Oct. 4, 2012

(30) Foreign Application Priority Data
Dec. 21, 2009 (DE) .......................... 10 2009 059 884

(51) Int. Cl.
| | |
|---|---|
| *H02P 25/14* | (2006.01) |
| *H02P 1/18* | (2006.01) |
| *H02P 3/00* | (2006.01) |
| *H02P 3/14* | (2006.01) |
| *H02P 7/00* | (2006.01) |
| *H02P 29/02* | (2006.01) |

(52) U.S. Cl.
CPC .............. *H02P 25/14* (2013.01); *H02P 29/021* (2013.01)

USPC ........... 318/245; 318/246; 318/362; 318/375; 318/376; 318/432; 318/434

(58) Field of Classification Search
CPC ....... H02P 25/14; H02P 25/145; H02P 7/295; H02P 3/12
USPC .......... 318/245, 246, 362, 375, 376, 432, 434
See application file for complete search history.

(56) References Cited

U.S. PATENT DOCUMENTS

| | | | |
|---|---|---|---|
| 4,400,657 A | 8/1983 | Nola | |
| 6,236,177 B1 * | 5/2001 | Zick et al. ..................... | 318/362 |

(Continued)

FOREIGN PATENT DOCUMENTS

| | | |
|---|---|---|
| DE | 34 40 920 A1 | 5/1986 |
| DE | 40 21 559 C1 | 12/1991 |

(Continued)

OTHER PUBLICATIONS

International Search Report corresponding to PCT Application No. PCT/EP2010/069331, mailed May 25, 2011 (German and English language document) (8 pages).

*Primary Examiner* — Paul Ip
*Assistant Examiner* — Gabriel Agared
(74) *Attorney, Agent, or Firm* — Maginot, Moore & Beck LLP

(57) ABSTRACT

A method for operating a mains-operated electric motor for a power tool includes connecting a first side of an electric motor to a first mains and connecting a second side of the electric motor to a second mains using first and second switches, respectively, in particular semiconductor switches, and monitoring the operational reliability of the switches using an electronic controller for operating safety.

10 Claims, 2 Drawing Sheets

(56) References Cited

U.S. PATENT DOCUMENTS

| | | | |
|---|---|---|---|
| 6,885,745 B1 | 4/2005 | Handforth et al. | |
| 7,071,645 B2 * | 7/2006 | Hahn et al. | 318/379 |
| 7,427,842 B2 * | 9/2008 | Kress et al. | 318/432 |
| 2007/0090780 A1 * | 4/2007 | Kress et al. | 318/246 |
| 2007/0097566 A1 * | 5/2007 | Woods et al. | 361/33 |

FOREIGN PATENT DOCUMENTS

| | | |
|---|---|---|
| DE | 195 07 073 A1 | 9/1996 |
| DE | 197 33 533 A1 | 2/1999 |
| JP | 7-132199 A | 5/1995 |
| JP | 11-292436 A | 10/1999 |
| WO | 2005/101606 A1 | 10/2005 |

* cited by examiner

DISCONNECTION FROM MAINS USING SWITCHES FOR POWER TOOLS

This application is a 35 U.S.C. §371 National Stage Application of PCT/EP2010/069331, filed on Dec. 10, 2010, which claims the benefit of priority to Serial No. DE 10 2009 059 884.7, filed on Dec. 21, 2009 in Germany, the disclosures of which are incorporated herein by reference in their entirety.

The disclosure relates to a method for operating a mains-operated electric motor for a power tool with switches and monitoring same for operational reliability.

Mains-operated power tools usually include a universal motor and are generally connected to a mains network or disconnected therefrom by means of a mechanical switch.

SUMMARY

The disclosure is based on the object of connecting an electric motor with electronic switches to a mains network and of disconnecting it therefrom, and of providing monitoring of the operational reliability of the electronic switches so that in the event of disconnection from the mains with switches a high level of operational reliability of power tools is ensured.

This object is achieved as described herein. Further refinements of the disclosure are presented in the dependent claims and the description.

The advantages of the disclosure are that for a mains-operated power tool disconnection from the mains on both sides occurs with switches, and the operational reliability of the switches is specifically monitored.

The proposed methods permit the switches to be easily checked both individually and in combination and the method of functioning thereof to be safeguarded.

BRIEF DESCRIPTION OF THE DRAWINGS

The disclosure will be explained in more detail below with reference to the drawing, in which.

DETAILED DESCRIPTION

In some power tools it is necessary for the electric motor to have a protective ground connection in the switched-off position so that it is necessary to arrange an electronic switch in every mains connection of the power tool.

Figure 1:
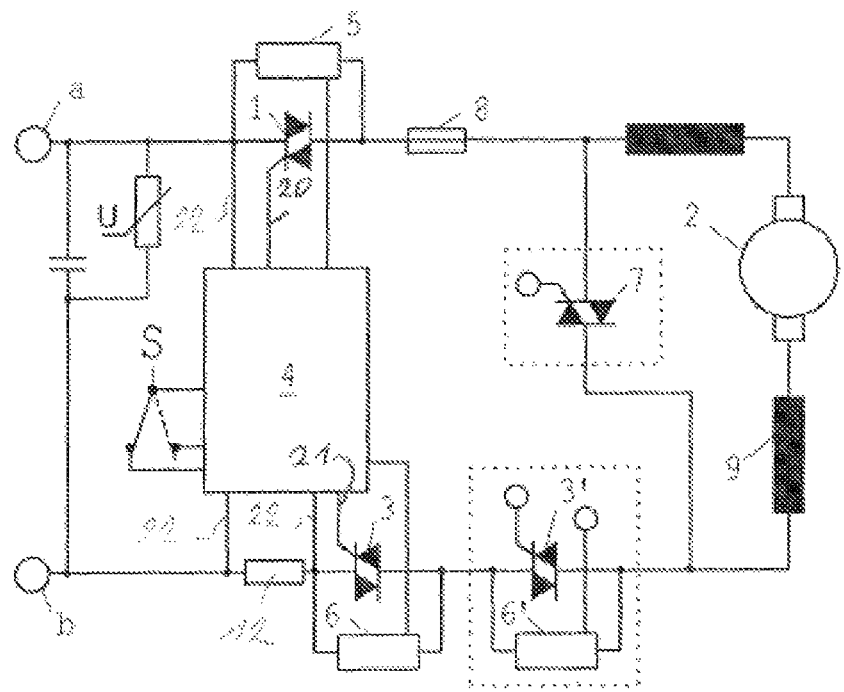
FIGS. 1 to 4 show circuit arrangements for mains-operated power tools with disconnection from the mains on both sides by means of electronic switches.

FIG. 1 shows such a circuit arrangement on which a first triac 1 is arranged in a first mains connection a of the universal motor 2, and a second triac 3 is arranged in a second mains connection b of the universal motor. An electronic controller 4 is assigned to the triacs 1, 3 (semiconductor switch). Instead of triacs, other types of electronic switches, in particular semiconductor switches, can also be used as semiconductor switches.

Since no mechanical mains disconnection switching element is provided, the operational reliability of the triacs 1, 3 is specifically monitored. For example, in each case a current monitoring device 5, 6 is assigned to the triacs 1, 3 here for monitoring the operational reliability, wherein a first current monitoring device 5 is connected in parallel with the first triac 1, and a second current monitoring device 6 is connected in parallel with the second triac 3.

The current monitoring devices are connected to the electronic controller 4 in order to monitor the triacs 1, 3, and the electronic controller 4 includes, for example, a microcontroller and is connected to an accumulator. The electronic controller is connected by means of signal lines 22 to the first mains connection a upstream of the first triac 1, and to the second mains connection b upstream of the shunt 12 and downstream of the shunt 12.

Comparison values for parameters, in particular operating parameters of the electric motor such as, for example, power consumption, voltage at the two connections of the electric motor and the rotational speed of the electric motor can be stored in the memory as a function of various switching situations of the semiconductor switches. Therefore, for example, comparison values are stored for the current, the voltage at the connections of the electric motor and the rotational speed for the first switching situation of the first and second switches activated, for the second switching situation of the first switches activated and the second switches deactivated, for the third switching situation of the first switches deactivated and the second switches activated and for the fourth switching situation of the first and second switches deactivated.

The current monitoring devices are interrogated by the microcontroller. The interrogation can take place if, for example, a power tool is connected to a mains network and during the operation of the motor in a time of a respective half wave of the mains, during which the semiconductor switches are not actuated.

The monitoring of the function of the triacs 1, 3 is done, for example, as follows: if, for example, a power tool is connected to a mains network or if the power tool is already connected to a mains network, the microcontroller firstly interrogates the current monitoring devices 5, 6 to determine whether a predefined current is flowing across the current monitoring devices 5, 6. If the first and the second triac 1, 3 are fully carrying out their blocking function, the predefined current flows across the first and across the second current monitoring device 5, 6 and across the universal motor 2. If the first triac 1 is activated, no current flows across the first current monitoring device 5. In such a case, the second triac is deactivated and the electronic controller 4 switches to fault. If the second triac 3 is activated, no current flows across the second current monitoring device 6. In this case, the first triac 1 is deactivated and the electronic controller 4 switches to fault.

If both the first and the second triacs 1, 3 are activated, that is to say short-circuited and they have an internal short circuit, no current flows across the first and across the second current monitoring device 5, 6. In such a case, a protective circuit may be provided by short circuiting the mains to a further semiconductor switch 7 and triggering a fuse 8. A fault may be displayed visually.

For additional safety, a plurality of electronic switches can be connected in series in the first or in the second mains connection or in both mains connections a, b, wherein a current monitoring device is connected in parallel with each switch. The function of the safety checking of the semiconductor switches corresponds to those of the previously described ones. In order to activate the power tool, a switching element S is assigned to the electronic controller 4, and this switching element has three connections for reliable detection of the switched position. The previously described current monitoring device 5, 6 for electronic switches 1, 3 is applied in a circuit arrangement even if a mechanical mains isolator is arranged.

For certain motor controllers it is also possible to connect a semiconductor switch in parallel with the armature 2 or a field winding 9.

Figure 2:
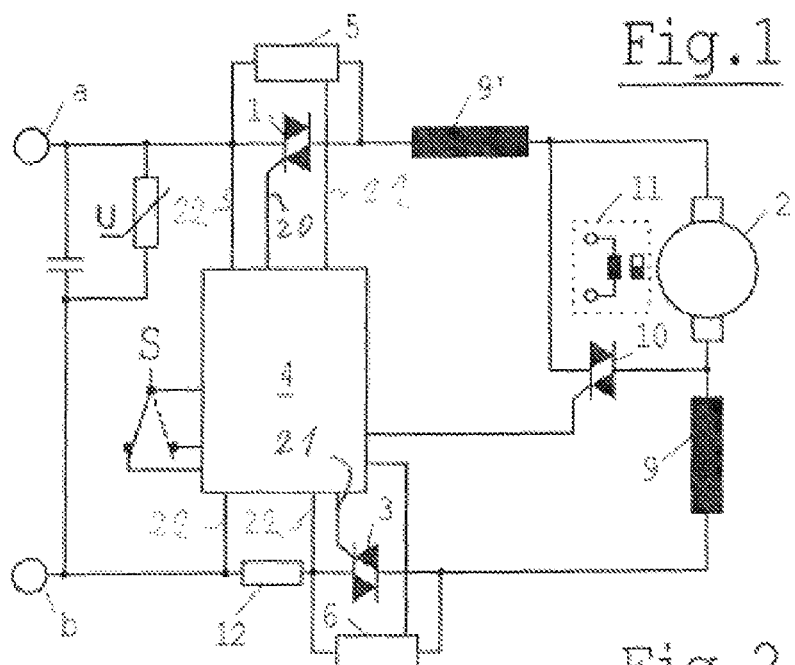

FIG. 2 shows such a circuit arrangement in which a semiconductor switch 10 is connected in parallel with the armature of the electric motor 2.

Such a semiconductor switch 10 can be monitored well with a rotational speed detection device 11. If operation of a motor is activated by means of the electronic controller 4 and the rotational speed evaluation does not detect any rotational speed of the motor, the semiconductor switch 10 which is connected in parallel with the armature will probably be defective. In addition, this semiconductor switch 10 can also be monitored by means of a shunt 12. If a predefined maximum current is exceeded, the connected semiconductor switches 1, 3 are immediately deactivated at the mains connections a, b and the electronic controller 4 is switched to fault.

Figure 3:
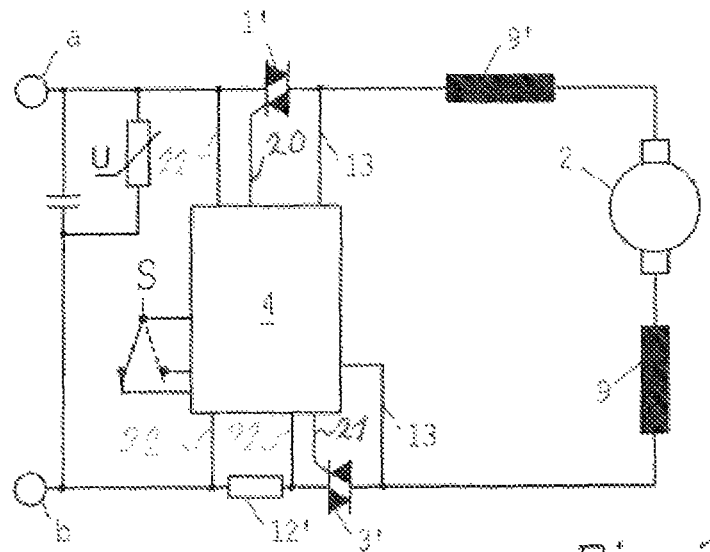

FIG. 3 shows an alternative means for monitoring the semiconductor switches 1', 3'. In each case a monitoring connection 13 leads to the electronic controller 4 from the motor connection to the semiconductor switches 1', 3'. If a voltage is present at one of the monitoring connections 13 during checking of the semiconductor switches, the electronic controller 4 switches to fault. The semiconductor switches can also be monitored by means of a shunt 12'. If a predefined maximum current is exceeded during monitoring of the semiconductor switches since the mains is fully actuated with the first semiconductor switch 1' and is weakly actuated with the second semiconductor switch 3', the second semiconductor switch is defective and the mains is fully actuated with the second semiconductor switch 3 and weakly actuated with the first semiconductor switch 1, the first semiconductor switch is defective if the predefined maximum current is exceeded.

In both cases the electronic controller switches to fault.

Figure 4:
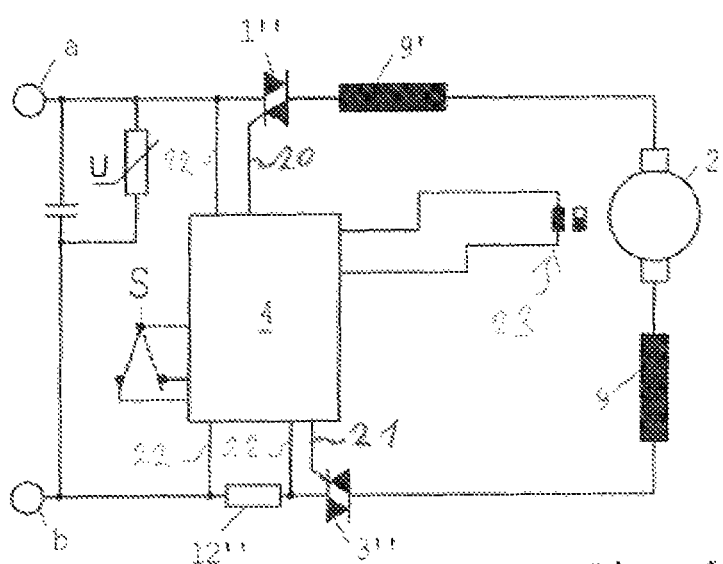

FIG. 4 shows a circuit arrangement with which semiconductor switches at the mains connections a, b are monitored by means of a shunt 12" and by means of a rotational speed evaluation by means of a rotational speed sensor 23. The rotational speed sensor 23 is assigned to the universal motor 2 and connected to the electronic controller 4 by means of further signal lines. During the checking of the switching safety of the semiconductor switches 1", 3", the first semiconductor switch 1" is actuated for a weak flow of current. If a rotational speed is detected, the second semiconductor switch 3" is defective and the electronic controller 4 switches to fault. If the second semiconductor switch is satisfactory, the second semiconductor switch is actuated for a weak flow of current, and if a rotational speed is detected, the first semiconductor switch is defective and the electronic controller 4 switches to fault.

The following methods can be carried out with the described embodiments:

The mains-operated electric motor 2 for a power tool has switches, in particular semiconductor switches 1, 3, the method of functioning of which is monitored for operational reliability with the electronic controller 4. In this context, a switch 1, 3 is arranged in each mains connection a, b to the electric motor. The switches are connected to the electronic controller by means of control lines 20, 21. In a first step the first switch 1 is activated and the second switch 2 is deactivated by the electronic controller 4. Then, the electronic controller detects an operating parameter of the electric motor 2 and compares it with a predefined value. A malfunction of the switches 1, 3 is detected by the electronic controller 4 if the detected operating parameter deviates from the predefined value. In a second step the first switch 1 is deactivated and the second switch 3 is activated by the electronic controller 4. An operating parameter of the electric motor is subsequently detected by the electronic controller and compared with a predefined value. The electronic controller 4 detects a malfunction of the switches 1, 3 if the detected operating parameter deviates from the predefined value. The value or values is/are stored in a memory which is connected to the electronic controller.

In a further embodiment, a current monitoring device 5, 6 is connected in parallel with each switch, and the current monitoring devices 5, 6 are connected to the electronic controller 4 for the purpose of monitoring the switches 1, 3 and for detecting the operating parameter.

In a further embodiment, the electronic controller 4 switches to fault if, during a monitoring check of the switches 1, 3, the detected operating parameter does not correspond to a predefined, stored value.

In a further embodiment, in each case a monitoring connection 13 leads to the electronic controller 4 from motor connections at the switches 1', 3', wherein an operating parameter is detected by means of the monitoring connection, wherein, in particular during checking of the switches 1', 3' during which the switches are activated, the electronic controller 4 is switched to fault if a voltage is present at one of the monitoring connections 13.

In a further embodiment, a voltage, a rotational speed or a flow of current is detected as an operating parameter by the electronic controller 4.

In a further embodiment, the switches 1", 3" monitored in mains connections a, b by means of a shunt 12", and/or by means of a rotational speed evaluation of the electric motor 2,
    wherein during checking of the switches 1", 3" the electronic controller 4 is switched to fault if the detected rotational speed and/or the detected flow of current deviate from the predefined value.

In a further embodiment, a request for monitoring of the switches 1, 3 is issued if a power tool is connected to a mains network or during operation of a motor in a time of a respective half wave of a mains network in which the switches are not actuated.

In a further embodiment, a protective circuit is activated and a further switch 7 is actuated by the electronic controller 4 if both the first switch 1 and the second switch 3 are defective.

In a further embodiment, a plurality of switches are connected in series in a first or in a second mains connection a, b or in both mains connections a, b.

In a further embodiment, a switch 10 is connected in parallel with an armature of the electric motor 2, and the switch 10 is monitored by means of a rotational speed detection device 11 and/or by means of a shunt 12.

In a further embodiment, the switches 1', 3' are additionally monitored by means of a shunt 12', and the electronic controller 4 is switched to fault if a predefined maximum current is exceeded.

In a further embodiment, the functional capability of the semiconductor switches of the mains-operated electric motor for a power tool is monitored for operational reliability with an electronic controller (4) having a microcontroller,
    wherein a semiconductor switch 1, 3 is arranged in each mains connection a, b of the electric motor, and an electronic controller 4 is assigned to the semiconductor switches,
    wherein the semiconductor switches 1, 3 are specifically monitored, wherein a current monitoring device 5, 6 is connected in parallel with each semiconductor switch,
    and in order to monitor the semiconductor switches 1, 3 the current monitoring devices 5, 6 are connected to the electronic controller 4, and the electronic controller 4 switches to fault if during a monitoring check of the semiconductor switches 1, 3 no current flows by means of a current monitoring device of the current monitoring devices 5, 6.

In a further embodiment, in a mains-operated electric motor for a power tool having semiconductor switches 1', 3', the operational reliability is monitored with an electronic controller 4 with a microcontroller, wherein in each case a monitoring connection 13 leads to the electronic controller 4 from motor connections at the semiconductor switches 1', 3', and during checking of the semiconductor switches 1', 3', the electronic controller 4 is switched immediately to fault if a voltage is present at one of the monitoring connections 13.

In a further embodiment, in a mains-operated electric motor for a power tool having semiconductor switches 1", 3" the operational reliability is monitored with an electronic controller 4 with a microcontroller, wherein the semiconductor switches 1", 3" are monitored in mains connections a, b by means of a shunt 12", and/or by means of a rotational speed evaluation, and during checking of the semiconductor switches 1", 3" the electronic controller 4 is switched to fault if a rotational speed is detected and/or an excessively high flow of current is determined.

In a further embodiment, the semiconductor switches are monitored, wherein a request for monitoring of the semiconductor switches 1, 3 is issued if a power tool is connected to a mains network or during operation of a motor in a time of a respective half wave of a mains network in which the semiconductor switches are not actuated.

In a further embodiment, the semiconductor switches are monitored, wherein a protective circuit is activated and a further semiconductor switch 7 is actuated by the electronic controller 4 if both the first semiconductor switch 1 and the second semiconductor switch 3 are defective.

In a further embodiment, the semiconductor switches are monitored, wherein a plurality of semiconductor switches are connected in series in a first or in a second mains connection a, b or in both mains connections a, b.

In a further embodiment, the semiconductor switches are monitored, wherein a semiconductor switch 10 is connected in parallel with an armature of the electric motor 2, and the semiconductor switch 10 is monitored by means of a rotational speed detection device 11 and/or by means of a shunt 12.

In a further embodiment, the semiconductor switches are monitored, wherein the semiconductor switches 1', 3' are additionally monitored by means of a shunt 12', and the electronic controller 4 is switched to fault if a predefined maximum current is exceeded.

The invention claimed is:

1. A method for operating a mains-operated electric motor for a power tool with switches, wherein the method of functioning of the switches is monitored for operational reliability with an electronic controller, comprising:
   arranging a first switch in a first mains connection line that is connected to a first side of the electric motor;
   arranging a second switch in a second mains connection line connected to a second side of the electric motor; and
   connecting the first and the second switches to the electronic controller by means of control lines;
   wherein in a first step (i) the first switch is activated and the second switch is deactivated by the electronic controller, (ii) an operating parameter of the electric motor is subsequently detected and is compared with a predefined value, and (iii) a malfunction of the switches is detected by the electronic controller if the detected operating parameter deviates from the predefined value,
   wherein in a second step (i) the first switch is deactivated and the second switch is activated by the electronic controller, (ii) an operating parameter of the electric motor is subsequently detected and is compared with a predefined value, and (iii) a malfunction of the switches is detected by the electronic controller if the detected operating parameter deviates from the predefined value, and
   wherein:
   a first current monitoring device is connected in parallel with the first switch in the first connection line,
   a second current monitoring device is connected in parallel with the second switch in the second connection line, and
   the first and the second current monitoring devices are each connected to the electronic controller for the purpose of monitoring the switches and for detecting the operating parameter.

2. The method as claimed in claim 1, wherein the electronic controller switches to fault if, during a monitoring check of the switches, the detected operating parameter does not correspond to a predefined value.

3. The method as claimed in claim 1, wherein:
   in each case a monitoring connection leads to the electronic controller from motor connections at the switches,
   an operating parameter is detected by means of the monitoring connection, and
   during checking of the switches during which the switches are activated, the electronic controller is switched to fault if a voltage is present at one of the monitoring connections.

4. The method as claimed in claim 1, wherein a voltage, a rotational speed or a flow of current is detected as an operating parameter by the electronic controller.

5. The method as claimed in claim 1, wherein:
   the first and the second switches are monitored in the first and the second mains connections by means of a shunt, and/or by means of a rotational speed evaluation of the electric motor, and
   during checking of the switches the electronic controller is switched to fault if the detected rotational speed and/or the detected flow of current deviate from the predefined value.

6. The method as claimed in claim 1, wherein a request for monitoring of the switches is issued if a power tool is connected to a mains network or during operation of a motor in a time of a respective half wave of a mains network in which the switches are not actuated.

7. The method as claimed in claim 1, wherein a protective circuit is activated and a further switch is actuated by the electronic controller if both the first switch and the second switch are defective.

8. The method as claimed in claim 1, wherein a plurality of switches are connected in series in the first or in the second mains connection or in both the first and the second mains connections.

9. The method as claimed in claim 1, wherein:
   a further switch is connected in parallel with an armature of the electric motor, and
   the further switch is monitored by means of a rotational speed detection device and/or by means of a shunt.

10. The method as claimed in claim 1, wherein:
    the first and the second switches are additionally monitored by means of a shunt, and the electronic controller is switched to fault if a predefined maximum current is exceeded.

\* \* \* \* \*